(12) United States Patent
Gunda et al.

(10) Patent No.: US 10,678,935 B2
(45) Date of Patent: Jun. 9, 2020

(54) IDENTIFYING CONTAINER FILE EVENTS FOR PROVIDING CONTAINER SECURITY

(71) Applicant: NICIRA, INC., Palo Alto, CA (US)

(72) Inventors: Laxmikant Gunda, Palo Alto, CA (US); Nilesh Awate, Pune (IN); Priyal Rathi, Pune (IN)

(73) Assignee: Nicira, Inc., Palo Alto, CA (US)

( * ) Notice: Subject to any disclaimer, the term of this patent is extended or adjusted under 35 U.S.C. 154(b) by 289 days.

(21) Appl. No.: 15/647,269

(22) Filed: Jul. 12, 2017

(65) Prior Publication Data

US 2018/0293394 A1 Oct. 11, 2018

(30) Foreign Application Priority Data

Apr. 11, 2017 (IN) .............................. 201741012979

(51) Int. Cl.
| | |
|---|---|
| *G06F 21/62* | (2013.01) |
| *G06F 9/455* | (2018.01) |
| *G06F 21/53* | (2013.01) |

(52) U.S. Cl.
CPC ...... *G06F 21/6209* (2013.01); *G06F 9/45558* (2013.01); *G06F 21/53* (2013.01); *G06F 9/45545* (2013.01); *G06F 2009/45579* (2013.01); *G06F 2009/45587* (2013.01)

(58) Field of Classification Search
CPC ............... G06F 9/45558; G06F 9/5077; G06F 9/45533; G06F 9/455; G06F 2009/4557; G06F 2009/45587; G06F 2009/45562; G06F 2009/45575; G06F 2009/45566; G06F 21/53

See application file for complete search history.

(56) References Cited

U.S. PATENT DOCUMENTS

| | | | | |
|---|---|---|---|---|
| 9,667,725 | B1 * | 5/2017 | Khanduja | ........... G06F 9/45558 |
| 9,830,193 | B1 * | 11/2017 | Wagner | ................ G06F 9/5077 |
| 9,910,713 | B2 * | 3/2018 | Wisniewski | .......... G06F 9/5055 |
| 10,127,234 | B1 * | 11/2018 | Krishnan | ............... G06F 16/119 |
| 10,146,936 | B1 * | 12/2018 | Khanduja | ............. G06F 21/552 |
| 10,326,744 | B1 * | 6/2019 | Nossik | ................... H04L 9/0822 |
| 10,380,081 | B2 * | 8/2019 | Brady | ................... G06F 9/5077 |
| 2016/0098285 | A1 * | 4/2016 | Davis | .................. G06F 9/45545 |
| | | | | 718/1 |
| 2016/0335107 | A1 * | 11/2016 | Behera | ................ G06F 9/45558 |
| 2016/0359740 | A1 * | 12/2016 | Parandehgheibi | .. H04L 63/1425 |

(Continued)

*Primary Examiner* — Tae K Kim
(74) *Attorney, Agent, or Firm* — Fish & Richardson P.C.

(57) ABSTRACT

A method of providing security for containers executing on a physical host machine is provided. The method receives a notification of a file access request. The notification includes a path in a file system of the host machine being accessed by a process. From the path, the method determines whether the file access event is for accessing a location in the file system to which container file systems are mapped. The method identifies a namespace of the process using the identification of the process included in the file path. The method determines the process is a container when the namespace belongs to a service that is used to implement containers on the host machine. The method sends the identifier of the container, the identification of a VM executing the container, and the file path to a set of security applications to determine whether the file access request to be allowed.

20 Claims, 7 Drawing Sheets

(56) References Cited

U.S. PATENT DOCUMENTS

| | | | | |
|---|---|---|---|---|
| 2016/0371127 A1* | 12/2016 | Antony | ............. | G06F 9/5077 |
| 2016/0381058 A1* | 12/2016 | Antony | ............. | H04L 63/1425 |
| | | | | 726/23 |
| 2017/0177413 A1* | 6/2017 | Wisniewski | ............. | G06F 9/5055 |
| 2017/0180249 A1* | 6/2017 | Shen | ............. | H04L 45/586 |
| 2017/0249469 A1* | 8/2017 | Goyal | ............. | G06F 21/62 |
| 2017/0249472 A1* | 8/2017 | Levy | ............. | G06F 21/6245 |
| 2017/0316211 A1* | 11/2017 | Cooper | ............. | G06F 21/577 |
| 2018/0074748 A1* | 3/2018 | Makin | ............. | G06F 9/4856 |

\* cited by examiner

IDENTIFYING CONTAINER FILE EVENTS FOR PROVIDING CONTAINER SECURITY

RELATED APPLICATION

Benefit is claimed under 35 U.S.C. 119(a)-(d) to Foreign Application Serial No. 201741012979 filed in India entitled "IDENTIFYING CONTAINER FILE EVENTS FOR PROVIDING CONTAINER SECURITY", filed on Apr. 11, 2017, by Nicira, Inc., which is herein incorporated in its entirety by reference for all purposes.

BACKGROUND

The host machines in a datacenter execute multiple guest virtual machines (VMs). Each VM runs its own guest operating system. Containers, on the other hand, are self-contained execution environments that share the kernel of the host machine's operating system.

Today, there is a new trend of containerized applications that allow sandboxing processes and controlling their resource allocations. For instance, Docker has commoditized Linux capabilities and made it easy to be used by applications. However, containers are not completely secure today. The Linux container capabilities have not been designed with security in mind. Hence the applications running inside the containers are at risk. If some rogue application gains root access in a container it can gain root access to the VM.

Datacenters provide agentless security for guest VMs by partnering with various anti-virus and anti-malware vendors. The security applications require knowledge of file events and the context, such as the process and user information, associated with the events. Currently file introspection functionality is provided in the host machines at the VM level, which allows the security vendors to provide protection policies at the VM level.

However, when a VM is running multiple containers, there is no way of providing a granular container level policy. A container hides the applications running inside. There is currently no way to differentiate whether a file event is generated within a container or from a VM. In addition, the container specific context, such as the process and user information, associated with a file event is not available outside the containers.

BRIEF SUMMARY

Some embodiments provide a method of securing containers that execute in guest VMs on a physical host machine. The method registers to a file system event monitor service to receive notification of file access requests. The registration includes sending to a file system event monitor a list of at least a file, a directory, or a disk mount for which file access requests are to be monitored.

The method receives a notification regarding a file access request event. The notification includes the path of a file, a directory, or a disk mount that is being accessed. The method determines whether the file access event is for accessing a file system location that containers can access. When the file access request is for accessing the volumes that containers can access, the method uses the process identification that is included in the path to lookup for the process namespace. The process then determines whether the namespace belongs to a containerization platform. The containerization platform is used to automate deployments of the containers and the applications that run inside the containers.

When the namespace belongs to the containerization platform, the process determines that the process that has requested the file access is a container. The process then determines whether the container is one of the live containers. When the container is one of the live containers, the process obtains the context related to container and sends the container identification, the guest VM identification, and the container context to a set of security applications.

Each security application, depending on the security service the provided by the application, scans the file for any virus, malware, etc., and sends back a verdict. Based on the verdict, the method either allows the access to succeed or denies the request.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Containers like any other applications running on a host VM are vulnerable to attacks from viruses, malwares, gain root access, etc. A container runs in an isolated environment using the container's own file system namespace, process namespace, process group, and network interfaces. There is currently no insight into a container activity from outside. Information required by security solutions is not visible outside a container. Some specific examples are (i) file systems and external storage devices that are mounted in a container and (ii) information about processes that start and stop within the container.

Guest file introspection in the past provided file introspection in a centralized manner from outside of guest VMs. File introspection provided by some datacenters offloads file scanning from a production VM to a dedicated security appliance VM (SVM) running on the same host. This feature is used for optimizing antivirus protection in virtual environments. For instance, third party partners of a datacenter utilize the feature to provide different security serveries for applications running on the hosts in the datacenter. Some additional use cases for file introspection include file backup, encryption, data leakage prevention, file integrity monitoring, server access monitoring, and identity based firewall.

Containers require the same kind of protection that a VM needs. The existing file introspection methods, however, do not provide file introspection for containers running inside guest VMs. While prevalent security solutions like anti-virus, anti-malware, vulnerability management, and firewalls are able to monitor and protect container host VMs, the closed nature of a container makes it fairly complex for these solutions to detect any malicious activity happening inside a running container, thereby failing to protect the container.

Some embodiments provide a method and a system that enable monitoring of file activities that happen within each container running on the container's host VM. The container's host VM is a guest VM in which the container executes. The container file activities are monitored without the need for any agent running inside a container. Some embodiments utilize an agent that runs on the host VM outside of the containers for monitoring the file activities.

I. Providing File Introspection for Containers

Figure 1:
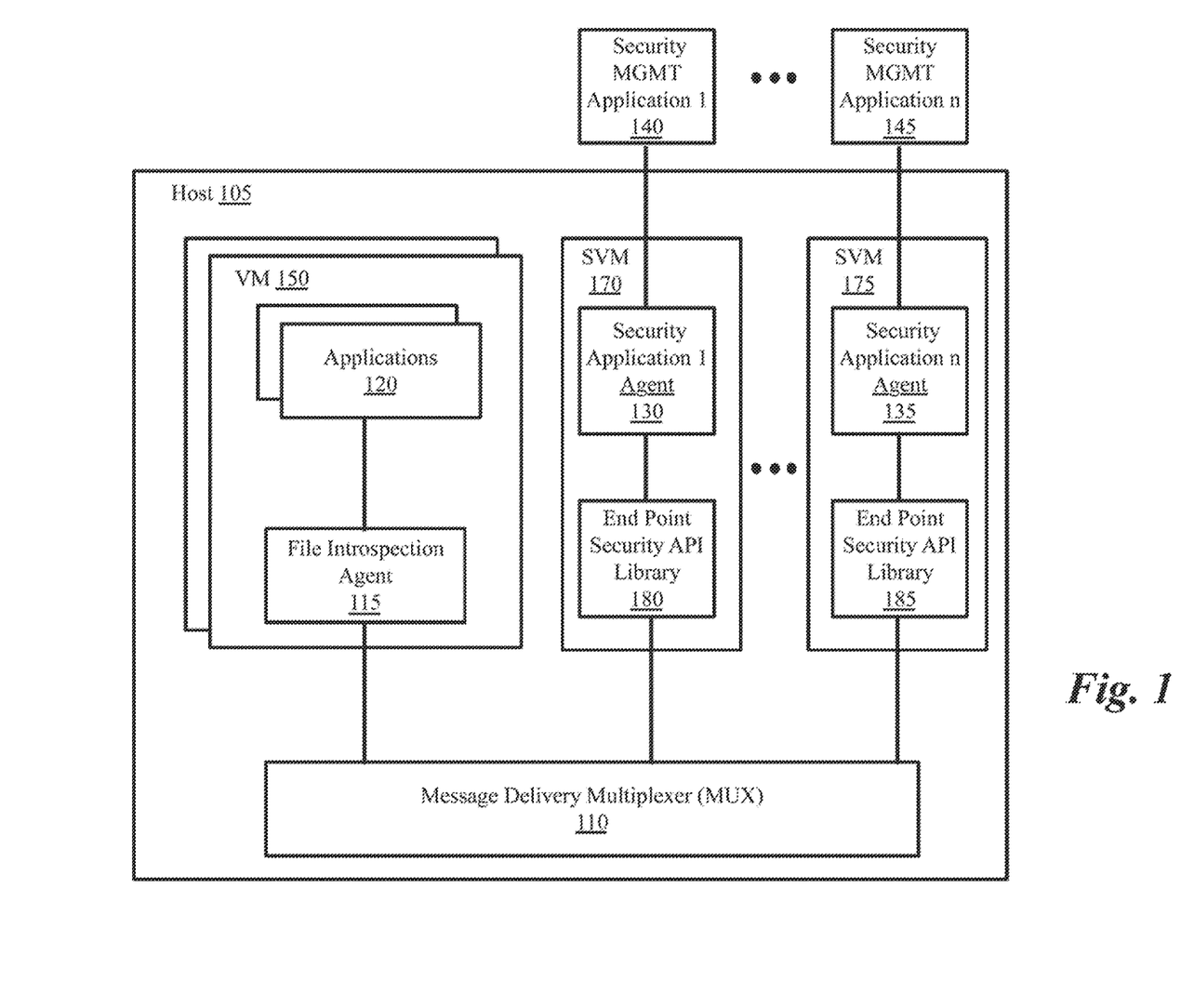
FIG. 1 conceptually illustrates security solutions provided for file access in some embodiments.

File introspection is required for anti-virus, access control, data leakage prevention, file integrity monitoring, etc. FIG. 1 conceptually illustrates security solutions provided for file access, in some embodiments. As shown, a host 105 hosts several VMs 150, each VM running several applications 120. The host also includes a file introspection agent 115 and a message delivery multiplexer (MUX) 110.

The host also hosts several VMs 170-175, referred herein as security appliance VMs (SVMs), which include a security application agent 130-135. Each security application agent 130-135 uses an instance of an end point security API (application programming interface) library 180-185 for registering for file events.

File introspection agent 115 is a thin agent that runs as an in-guest component in guest VMs 150. File introspection agent intercepts file system calls, delivers (on-access/on-demand) events to the security application agents 130-135, processes additional requests received from the security application agents, and takes action based on the verdict received from the security application agents.

Each security application agent 130-135 is built (e.g., by third party vendors) to link with an instance of end point security API library 180-185 for communicating with the file introspection agent 115. Message delivery multiplexer 110 is a process that runs on the host and acts as a multiplexer that accepts messages from the guest VMs 150 and delivers the messages to the SVMs 170-175 and vice versa. Message delivery multiplexer in some embodiments is installed as a driver on the host machine 105.

The SVMs get control of each file open and file close action that happen on a guest VM 150 before the action reaches the file system. This is achieved with the help of the file introspection agent 115, which traps each file open and close, informs the SVMs of this event, and waits for the verdict from the SVMs. Each SVM, depending on the security service the SVM provides, scans the file for any virus, malware, etc., and sends the verdict to the file introspection agent 115. Based on the verdict, the file introspection agent 115 either allows the access (e.g., open or close) to succeed or denies the operation.

End point security API library 180-185 is a library that provides APIs to security application agents 130-135 to register for guest the events of interest for processing and allows providing the verdict for a file event by the security applications. Each security application agent 130-135 links to an instance of the end point security API library and uses the provided APIs to receive notifications for the different file events. Each security application agent 130-135 has a security management plane application counterpart 140-145 that runs outside the host and provides security policies (such as policies for anti-virus, malware, firewall, etc.) to the security application agent.

Although security applications agents 130-135 are shown inside the SVMs 170-175 hosted by host 105, in other embodiments security applications agents 130-135 run inside SVMs hosted by other hosts. In these embodiments, the message delivery multiplexer 110 exchanges messages between the guest VMs 150 inside host 105 and SVMs 170-175 outside host 105.

Figure 2:
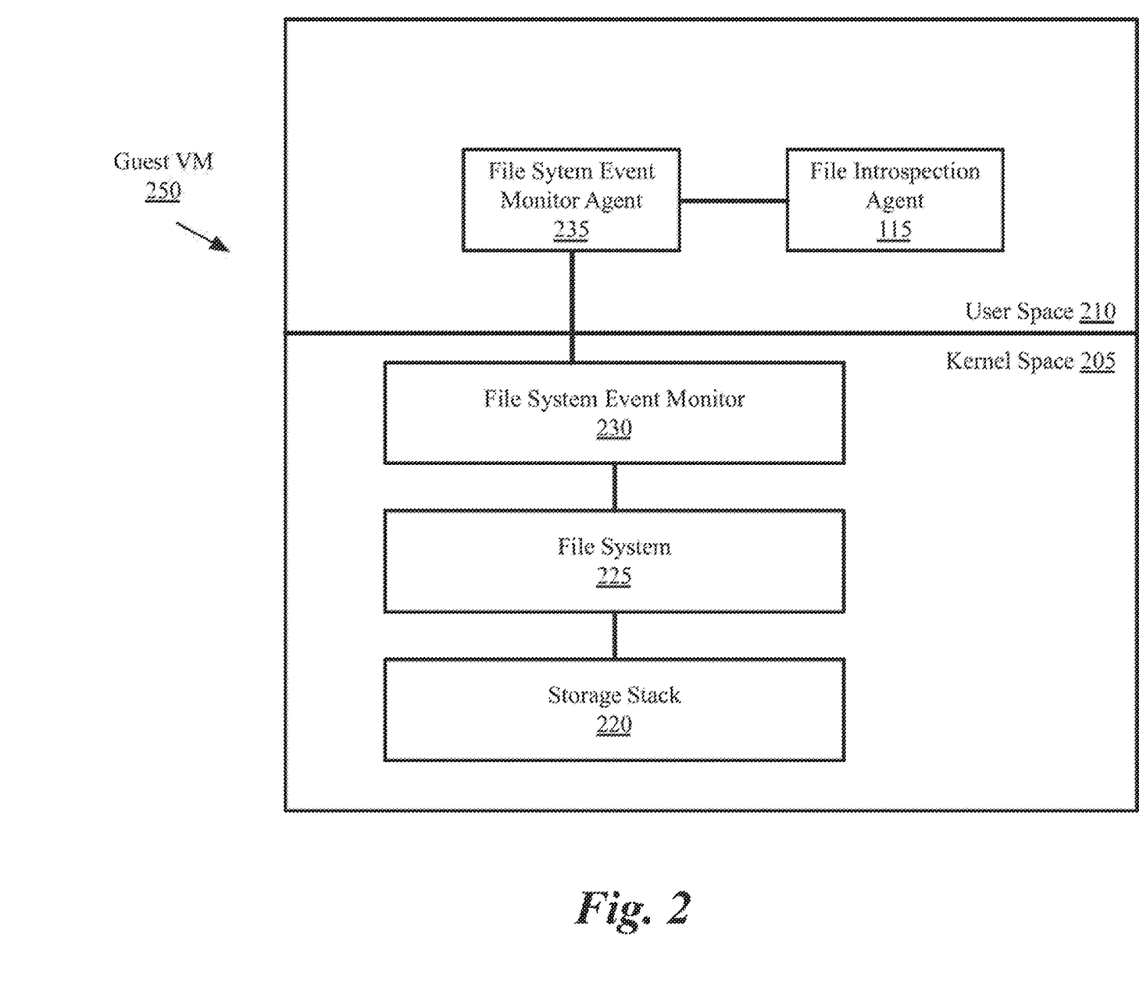
FIG. 2 conceptually illustrates the interactions of the file introspection agent with the file system components of a guest VM in some embodiments.

FIG. 2 conceptually illustrates the interactions of the file introspection agent with the file system components of a guest VM in some embodiments. As shown, the guest VM 250 includes a kernel space 205 and a user space 210. The guest operating system (or the kernel) runs in the kernel space. The user programs run in the user space.

As shown, the file system 225 is in kernel space. The storage stack 220 includes the drivers (such as disk drivers and volume management drivers) and interfaces that support the file system. File system event monitor 230 includes an API that provides notification and interception of file system 225 events. The API provides the ability to monitor the objects in a mounted file system, the ability to make access permission decisions, and the possibility to read or modify files before access by other applications. The API allows monitoring of accessing events for a file, a directory, or a disk mount.

In some operating systems such as Linux, users can write their own drivers and hook the drivers on top of the file system to get file system events. Although Linux is an open source system, kernel components are typically provided by vendors. If a user installs a driver that is neither part of Linux kernel nor provided by the vendor, the driver "taints" the kernel. The operating system vendors do not support tainted kernels in case of any issues.

Accordingly, the embodiments of the invention use a file introspection agent 115 that runs in the user space 210. The file introspection agent 115 in the guest VM 250 registers with the file system event monitor 230 through file system event monitor agent 235, which is also a user space process. File introspection agent 115 registers for particular file access events and receives notification of the events from file system event monitor 230 through file system event monitor agent 235.

The file system event monitor 230 in some embodiments is provided by the operating system used by the guest VM. In other embodiments, file system event monitor 230 is a process developed by the user of the guest VM. Yet in other embodiments, file system event monitor 230 is a process developed by third party vendors.

A. File Introspection for Containers

Every container that runs on a host has its own set of mount points that are not visible to any process running outside of the container. A mount point or directory defines the place of a data set in the file system. The disk partitions are attached to the system through amount point. The file introspection agent 115 does see the file activity happening within the container through the event notifications provided by the file system event monitor 230. However the file paths obtained in the file system event monitor events are, different than the logical paths of the files within each container.

The file protection policies provided by security applications 140-145 may be based on the volumes or mount points within the container. For instance, in a Linux based system, the security applications may require scanning of the directory /bin inside a container but the file paths obtained by the file introspection agent 115 through the file system event monitor 230 may specify/var/lib/docker/aufs/diff/<container id>/bin. In this example, "/" indicates the root partition, /var is the storage for temporary files created by users, and /lib includes library files needed by the system and user programs.

Docker in this example is a utility (or a containerization platform) that is used to create and ran containers. Aufs (advanced multi-layered unification filesystem) is an example of a storage driver used by Docker. A container's writable layer is stored under /var/lib/docker/aufs/diff<container id>/bin, where container id is the identification of the container, and /bin is where the common programs for the container are stored. Although, the invention is described by using examples that reference to a VM that utilizes Linux operating system and Docker as the containerization platform, it should be understood that the same approach applies to other operating systems and/or other containerization platforms.

Figure 3:
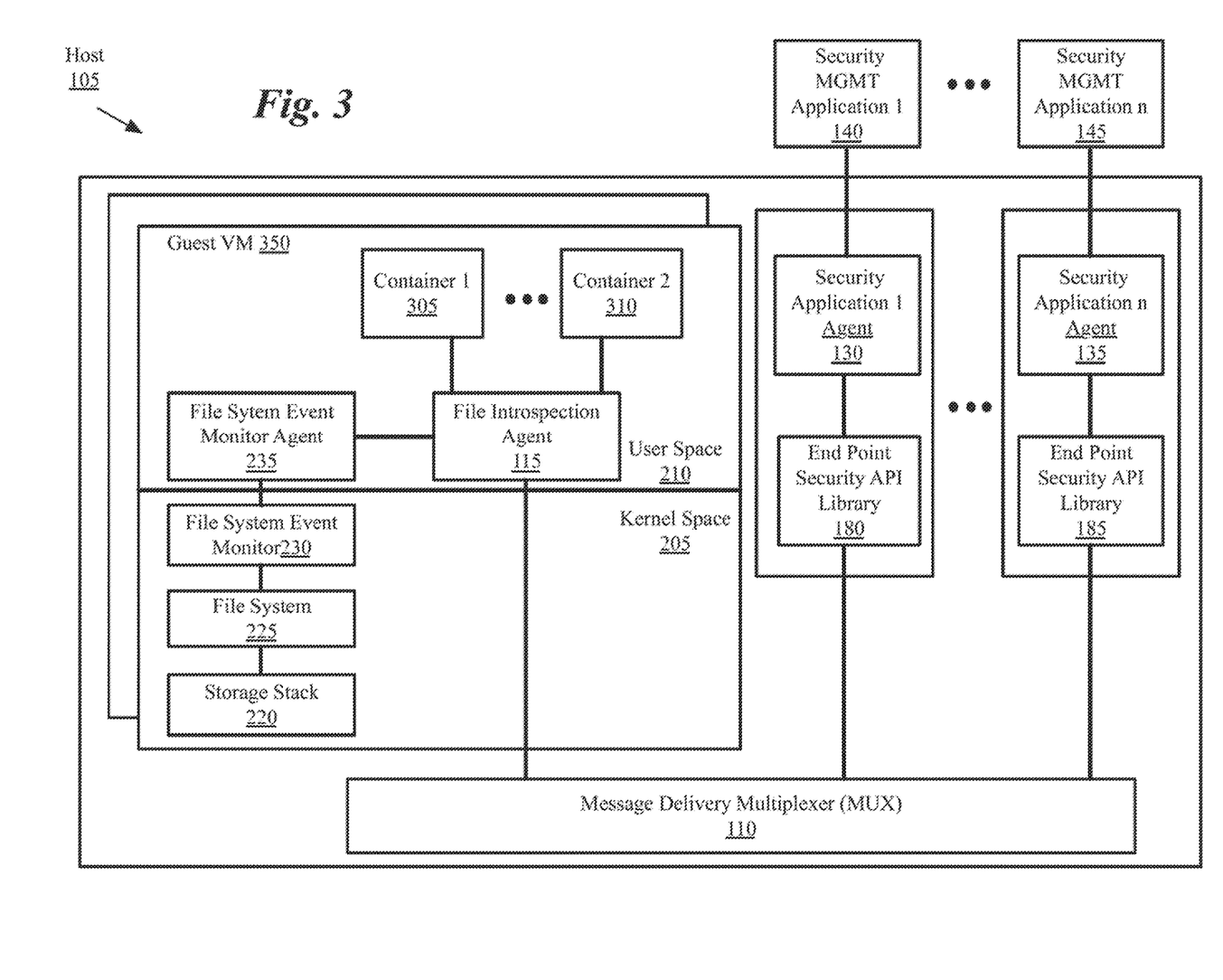
FIG. 3 conceptually illustrates a system that provides security for containers in some embodiments.

FIG. 3 conceptually illustrates a system that provides security for containers in some embodiments. As shown, the host 105 includes several guest. VMs such as guest VM 350. Each guest VM includes (or hosts) several containers 305-310.

In this example, several security application agents 130-135 provide different security services such as anti-virus, anti-malware, vulnerability management, firewalls, etc., for the host 105. Each security application agent 130-135 has a security management plane application counterpart 140-145 that runs outside the host and provides security policies (such as policies for anti-virus, malware, firewall, etc.) to the security application agent. Operations of file introspection agent 115, file system event monitor 230, file system 225, and storage stack 220 were described above by reference to FIG. 2.

Although security applications agents 130-135 are shown inside the SVMs 170-175 hosted by host 105, security applications agents 130-135 may run inside SVMs hosted by other hosts. In these embodiments, the message delivery multiplexer 110 exchanges messages between the guest VMs 350 inside host 105 and SVMs 170-175 outside host 105.

Figure 4:
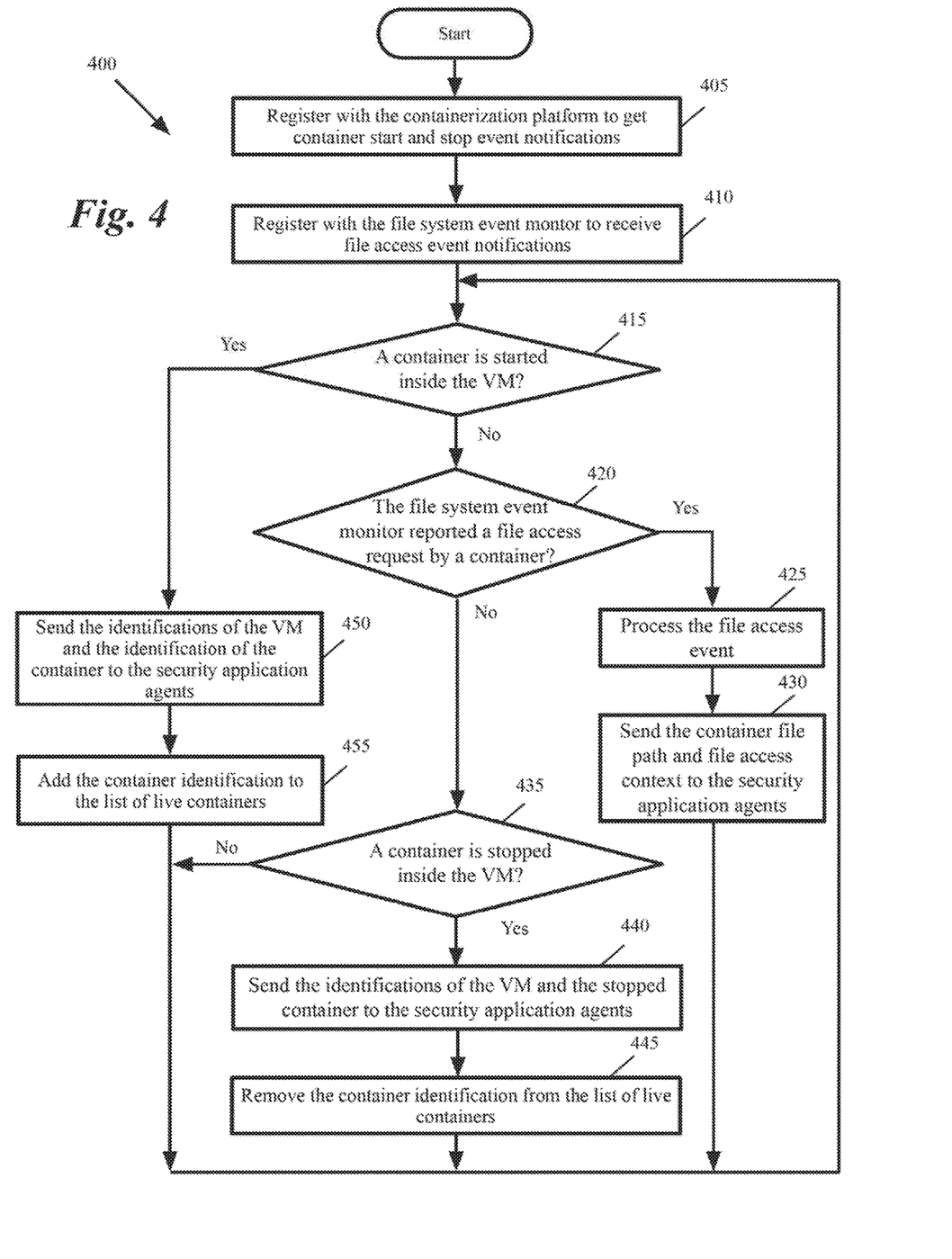
FIG. 4 conceptually illustrates a high-level process for receiving file access information for containers in some embodiments.

Upon the start of each container 305-310, guest VM registers with file system event monitor 230 to get informed when a file access is initiated by the container. FIG. 4 conceptually illustrates a high-level process 400 for receiving file access information for containers in some embodiments. The process in some embodiments is performed by a guest VM such as guest VM 350 in FIG. 3.

As shown, the process registers (at 405) with the containerization platform to receive container start and start event notifications. The containerization platform automates deployments of the containers and the applications that run inside the containers. For example the process registers with the file system event monitor agent 235 in FIG. 3 to monitor container start, pause, and stop events.

The process then registers (at 410) with the file system event monitor to receive file access event notifications. For instance, the file introspection agent 115 in FIG. 3 makes an API call through file system event monitor agent 235 to receives file access notifications. The API call in some embodiments includes parameters to identify the list of files, directories, and mount points for which events are to created.

The process then determines (at 415) whether a container is started inside the VM. The containers in some embodiments are child entities of VMs. The process, for instance, determines whether container 305 is started inside guest VM 305 in FIG. 3. If not, the process proceeds to 420, which is described below. Otherwise, the process sends (at 450) the identification of the VM and the identification of the powered on container to the security applications. For instance, the process sends a power on (or container start) message that includes the identifications of the VM and the started container to one or more of the security application agents 130-135 through the message delivery multiplexer 110 and the API libraries 180-185 in FIG. 3. The process then adds (at 455) the container identification to the list of live containers. The process then proceeds to 415, which was described above.

At 420, the process determines whether the file system event monitor has reported a file access request by a container. For instance, the process determines whether the file system monitor 230 in FIG. 3 has reported that one of the containers 305-310 has requested a file access. If not, the process proceeds to 435, which is described below. Otherwise, the process processes (at 425) the file access event. The process then sends (at 430) the file path that the container attempts to access and the associated context to security application agents. Details of the processing of a file event access are described further below. The process then proceeds to 415, which was described above.

At 435, the process determines whether a container is stopped inside the VM. For instance, the process determines whether container 305 is stopped inside guest VM 405. In some embodiments, the process also determines whether a container is paused (e.g., to make a change to the container). If not, the process proceeds to 415, which was described above. Otherwise, the process sends (at 440) the identification of the VM and the identification of the stopped container to the security application agents. For instance, the process sends a power off messages that includes the identification of the VM and the identification of the powered off container to one or more security application agents 130-135. The process then removes (at 445) the identification of the stopped container from the list of live containers. The process then proceeds to 415, which was described above.

In the embodiments that utilize Linux and Docker, the file system event monitor agent is a Docker daemon that is included in the guest VM as a plugin. The file introspection agent is a thin client that runs inside the VM that connects to the Docker daemon over a UNIX domain socket and monitors container events like container start/stop/pause etc., over the socket. The plugin also maintains (e.g., as described above by reference to operations 445 and 455 in FIG. 4) a list of all live (i.e., currently running) containers and ensures that this list is in sync with the actual containers running.

The instances of the API library 180-185 in these embodiments provide Docker APIs. The information regarding the live containers is provided to the security applications 140-145 as part of a containers power-on event (e.g., as described above by reference to operation 415 and 445 in FIG. 4). The system event monitor in some embodiments uses Linux "fanotify" API calls to get access to the file system events.

Figure 5:
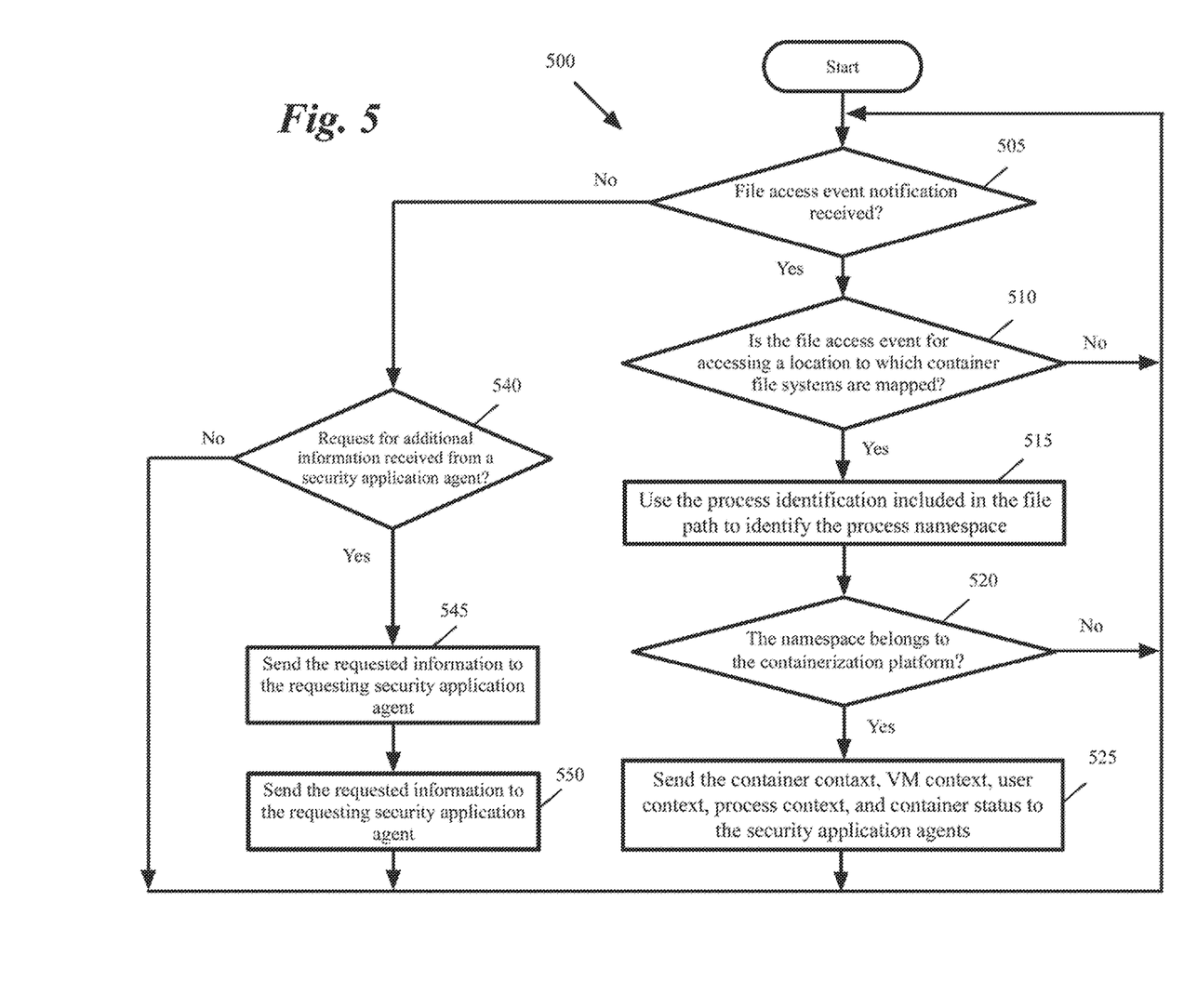
FIG. 5 conceptually illustrates a process for receiving, identifying, and processing container file access events in some embodiments.

FIG. 5 conceptually illustrates a process 500 for receiving, identifying, and processing file access events in some embodiments. The process in some embodiments is performed by a file introspection agent such as the file introspection agent 115 in FIG. 3. The process provides further details of operations 425 and 430 in FIG. 4.

As shown, the process determines (at 505) whether a notification of a file access event is received from the file system event monitor. For instance, the process determines whether a file access event notification is received at the file introspection agent 115 from file system event monitor agent 235 in FIG. 3. If not, the process proceeds to 540, which is described below.

The process then determines (at 510) whether the file access event is for accessing a file system location that includes the volumes to which containers have access. The process in some embodiments receives the full path of the file, directory, or mount that is being accessed. In the example of Linux operating system, the container file system is mapped to the host VM file system under the directory /var/lib/docker/aufs/diff. This file system location is used for obtaining a list of volumes to which a container has access. This list of volumes is also provided to the security applications 140-145.

On a file event from the file system event monitor, the file path is compared with /var/lib/docker/aufs/diff to check whether the file path belongs to a container. If there is a match, the file access can be from a container. When the file access event is not for accessing a location that container can access (e.g., when the file path does not match /var/lib/docker/aufs/diff in a Linux system), process 500 ignores the file access event and proceeds to 505 to wait for the next event.

Otherwise, the process uses the process identification in the file path to lookup (at 515) for the process namespace. The process then determines (at 520) whether the namespace belongs to the containerization platform. For instance, when Docker is used as the containerization platform, the namespace includes "/docker". The process, therefore, determines whether the containerization platform name is included in a portion of the namespace path.

In the example of a Linux operating system and Docker containerization platform, the field following /diff in the file path identifies the process identification (pid). The pid is looked up in the /proc file system to get the process namespace. In a Linux system the namespace is stored in (proc/<pid>/cgroup.

A namespace is used to wrap a group of system resources and provide them to a process such as a container to make the resources appear as being dedicated to the process. The cgroup manages resources for a group of processes. If the name space belongs to Docker, then the file event is generated by a container process. For instance, when the file path is /var/lib/docker/aufs/diff<container id>bin/ls, the file access request is generated by the container with "container id" as specified in the file path. In this example, /bin/ls is a command to generate a listing of the container's bin directory where the common programs are stored.

When the namespace does not belong to the containerization platform, the process proceeds to 505 to wait for the next event. Otherwise, the process obtains the contexts related to one or more of the (i) container, (ii) VM, (iii) user, (iv) process, and (v) the file for which the access event is received. The container context includes the container identification. The VM context includes the VM identification. The user context includes the user identification and the group identification of the user that is using the container. The process context induces the identification of the process that has requested the file access. The file context includes the file identification, the file path, and the file attributes. The term file access is used herein to refer to any operation that attempts to create, delete, read, write, or modify a file.

The process also determines whether the container is one of the live containers. For instance, the <container id> from the above path is compared with the live container list that is maintained by the file system event monitor agent 235 in FIG. 3.

The process sends (at 525) the contexts and the container status as part of the file event (/bin/ls) to the security application agents. For instance, the process sends the context from tile introspection agent 115 to one or more security application agents 130-135 through the message delivery multiplexer 110 and the API library instances 180-185. The process then proceeds to 505 to wait for the next event.

At 540, the process determines whether a request for additional information is received from a security application agent. If not, the process proceeds to 505, which was described above. Otherwise, the process acquires (at 545) the requested information. In some embodiments, the security application agents may require additional information for a file, a user, a process, etc., in order to determine whether or not a file access should be allowed. For instance, a security application agent may require knowing the details of the process (e.g., what library is loaded by the process, how much memory is consumed by the process, etc.) that is requesting the file event. In some embodiments, a security agent may request process 500 for any information that is available through the operating system. The process then sends (at 550) the requested information to the requesting security agent.

B. Container Aware Message Delivery Multiplexer

The message delivery multiplexer (MUX) 110 is responsible for routing the file and system events to security appliances 140-145 through the API library 180-185. The message delivery multiplexer 110 is container aware and routes the container file access events along with the VM file access, events to the security applications.

Whenever a guest VM starts, the file introspection agent 115 sends a message to the message delivery multiplexer 110. For instance, file introspection agent 115 sends a "hello" message to the message delivery multiplexer 110. The message delivery multiplexer 110 sends a "power on" event along with a unique identification of the guest VM (such as the BIOS (basic input/output system) UUID (universally unique identifier) or other UUID of the guest VM) to the security applications 140-145. The security applications use the "power on" event to know that a guest VM is up. Similarly, message deliver multiplexer 110 sends a "power off" event to inform the security applications that a guest VM is disconnected or stopped.

As discussed above by reference operations 440 and 450 in FIG. 4, the file introspection agent sends the information of a container to the security application agents whenever a container is started or stopped. For instance, the file introspection agent sends a "container start" event to the security solution whenever a container comes up and sends a "container stop" on a container shutdown. These events include the container identification and the container name that is being started or stopped.

Some embodiments also provide an API via a software development kit (SDK) to security application developers to get more information about each container. The API, for instance, provides information regarding the operating system version, distribution type if any etc., to the security applications 140-145.

C. Container Aware End Point Security API Library

The end point security API library 180-185 allows several container start and stop events from the message delivery multiplexer 100 for the same VM. The API library 125 implements "container start" (or CONTAINER_POWER_ON) and "container stop" (or CONTAINER_POWER_OFF) events that are received from the same VM but for different containers. These events include the container information and the host VM information. The container event is provided to the registered security application agents 130-135 through the API library 180-185.

D. Alternative Embodiment

Figure 6:
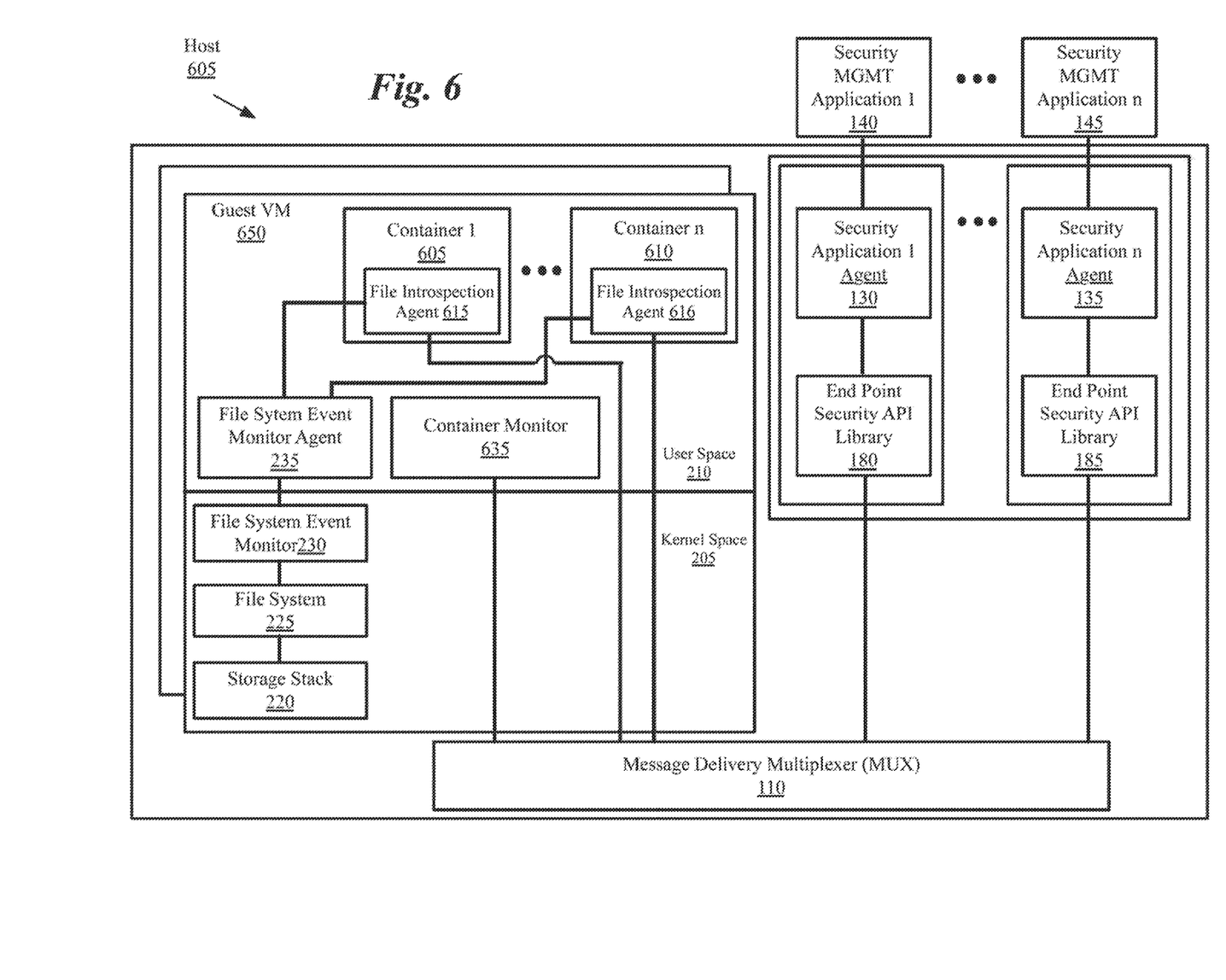
FIG. 6 conceptually illustrates an alternative embodiment for providing security for containers.

In some alternative embodiments, the file introspection agent is a thin client within each container. FIG. 6 conceptually illustrates an alternative embodiment for providing security for containers. Similar to FIG. 3, the guest VM 650 includes several containers 605-610. In FIG. 6, however, each container 605-610 includes a file introspection agent 615-616, respectively.

Since each container includes a separate file introspection agent, the file introspection agents in this embodiment are lighter than the file introspection agent in FIGS. 1-3. Each file introspection agent runs in the corresponding container to monitor all file and system activities occurring within each container.

The container monitor 635 is a monitor process that runs as a virtual appliance of the data center network manager. The container monitor monitors each guest VM 650 for adding, pausing, and stopping containers. Whenever a container is started, the container monitor 635 spawns the file introspection agent process inside that container.

One drawback for this approach is scalability. For instance, if a VM is running 100 containers at a time then there would be 100 instances of the file introspection agent. A container is typically provisioned per application. Having a file introspection agent per container may defeat the purpose of a container. The purpose of a container is to only run a limited number of applications that share resources. If the agent runs inside the container, the agent uses some of the resources allocated to the container. In addition, the users of containers for security propose does not want anything else to run inside the container.

In addition, the container monitor 635 is required within the network manager to monitor container activities such as container start/stop/pause etc. If the container monitor shuts down, crashes, or is unable to connect to the file system event monitor agent 235, it would not be able to ingest the file introspection agents in the new containers that are spawned. Lack of file introspection agents inside the containers can become a potential security loophole.

E. Advantages of Running Containers Inside VMs and Securing the VM and Containers Together Containers share a single host operating system across all application containers running on the same host. In a Linux environment, isolation is provided per application by the Docker engine using Linux namespace capabilities. Everything in Linux is, however, not a namespace. Currently, Docker uses five namespaces to alter processes view of the system: Process, Network, Mount, Hostname, and Shared Memory.

While these namespaces provide some level of security, the security is by no means as comprehensive as the security provided by virtualization software such as a hypervisor. In a hypervisor environment, processes in a virtual machine do not communicate with the hypervisor kernel directly. The processes do not have any access to hypervisor kernel file systems like /sys and /prod*.

Device nodes are used to communicate to the VMs kernel and not the hypervisor. Therefore in order to have a privilege escalation out of a VM (e.g., by a malicious process), the process has to subvert the VM's kernel, find vulnerability in the hypervisor, break through security-enhanced. Linux (SELinux) control (sVirt) that supports access control security policies and are very tight on a VM, and finally attack the hypervisor kernel.

On the other hand, when a process runs in a container the process is already at a point where it is talking to the host kernel. Major kernel subsystems are accessible to a process running within a container. These include SELinux, cgroups, and file systems under /sys, /prodsys, /prodsysrg-trigger, /prodirq, and /proc/bus.

Devices are also accessible to a process running with a container: /dev/mem, /dev/sd*, file system devices, and kernel modules. If a process can communicate or attack one of these as a privileged process, the process can gain control of the system.

A VM can support a relatively rich set of applications. However, running multiple micro-services in a single VM creates conflicting issues and running one micro-service per VM is not very efficient and may not be financially feasible for some organizations. Deploying containers in conjunction with VMs allows an entire group of services to be isolated from each other and then grouped inside of a VM. This approach increases security by introducing two layers, containers and VMs to the distributed application. While combining VMs and containers make for a better security, it is all the more evident to protect not just the VMs but also the containers.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
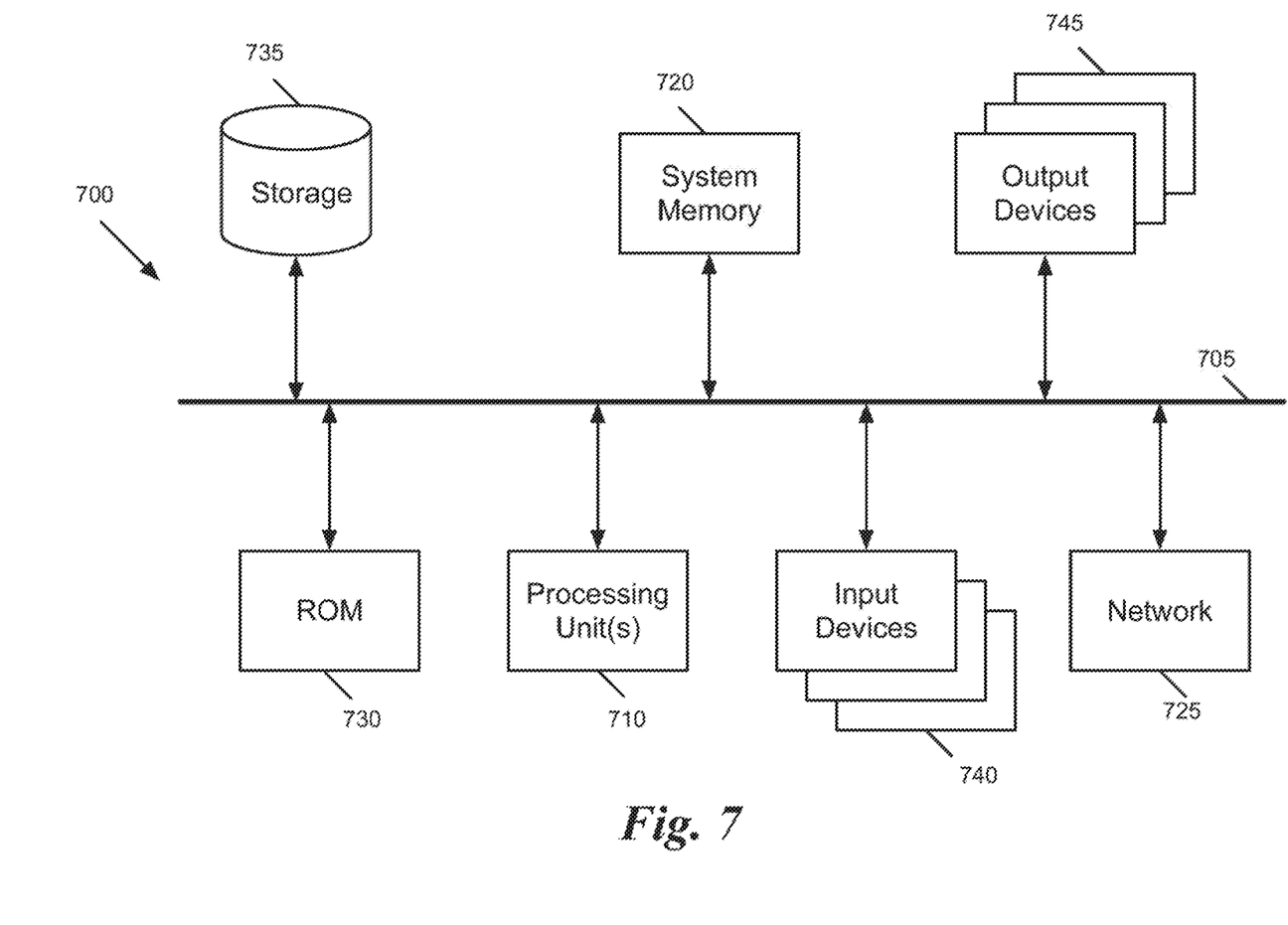
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 720, a read-only memory (ROM) 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 720, and the permanent storage device 735.

From these various memory units, the processing unit(s) 10 retrieve instructions to execute and data to process in order to execute the processes of the invention. The processing unit may be a single processor or a multi-core processor in different embodiments.

The read-only-memory 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 720 is a read-and-write memory device. However, unlike storage device 735, the system memory is a volatile read-and-write memory, such as random access memory. The system memory stores some of the instructions and data that the processor needs at runtime. In some embodiments, the invention's processes are stored in the system memory 720, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and penning devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 725 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of providing security for containers executing in guest virtual machines (VMs) on a physical host machine, the method comprising:
   receiving a notification of a file access request, the notification comprising a path in a file system of the host machine being accessed by a process;
   based on the path, determining whether the file access event is for accessing a location in the file system that includes volumes to which the containers have access, wherein the volumes to which containers have access are determined using a mapping of the container file system to the file system of the host machine being accessed by the process;
   in response to determining that the file access event is for accessing a location in the file system to which the containers have access, identifying a namespace of the process using an identification of the process included in the file path;
   determining the process is a container when the namespace belongs to a service implementing containers on the host machine; and
   sending an identifier of the container, an identification of a VM executing the container, and the file path to a set of security applications to determine whether the file access request to be allowed.

2. The method of claim 1 further comprising:
   registering to a file system event monitor service to receive notification of file access requests, said registering comprising sending a list of at least one of a file, a directory, and a disk mount for which file access requests to be monitored,
   wherein the notification of the file access request is received from the file system event monitor.

3. The method of claim 1 wherein identifying the namespace comprises using the identification of the process included in the file path to search the file system for the namespace associated with the identification of the process.

4. The method of claim 1, wherein sending the identifier of the container and the file path to a set of security applications comprises determining that the container is in a list of live containers.

5. The method of claim 4 further comprising:
   adding an identification of each container that is powered up inside a guest VM to the list of live containers; and
   removing an identification of each container that is powered off inside a guest VM from the list of live containers.

6. The method of claim 1, wherein a container is a self-contained execution environment that shares a kernel of the host machine's operating system.

7. The method of claim 1, wherein receiving the notification, determining whether the file access event is for accessing the location in the file system, identifying the namespace, determining the process is a container, and the sending are performed by a file introspection agent executing in a user space of the host machine inside the guest VM.

8. The method of claim 1 further compromising:
   receiving a verdict from at least one of the security applications regarding the file access request, the verdict determined based on a scan of a file, a directory, or a disk mount to which access is requested; and
   allows or denying the access based on the received verdict.

9. A non-transitory machine readable medium storing a program for providing security for containers executing in guest virtual machines (VMs) on a physical host machine, the program executable by a processing unit, the program comprising sets of instructions for:
   receiving a notification of a file access request, the notification comprising a path in a file system of the host machine being accessed by a process;
   determining, based on the path, whether the file access event is for accessing a location in the file system that includes volumes to which the containers have access, wherein the volumes to which containers have access are determined using a mapping of the container file system to the file system of the host machine being accessed by the process;
   in response to determining that the file access event is for accessing a location in the file system to which the containers have access, identifying a namespace of the process using an identification of the process included in the file path;

determining the process is a container when the namespace belongs to a service implementing containers on the host machine; and sending an identifier of the container, an identification of a VM executing the container, and the file path to a set of security applications to determine whether the file access request to be allowed.

10. The non-transitory machine readable medium of claim 9, the program further comprising a set of instructions for:

registering to a file system event monitor service to receive notification of file access requests, said registering comprising sending a list of at least one of a file, a directory, and a disk mount for which file access requests to be monitored, wherein the notification of the file access request is received from the file system event monitor.

11. The non-transitory machine readable medium of claim 9, wherein the set of instructions for identifying the namespace comprises a set of instructions for using the identification of the process included in the file path to search the file system for the namespace associated with the identification of the process.

12. The non-transitory machine readable medium of claim 9, wherein the set of instructions for sending the identifier of the container and the file path to a set of security applications comprises a set of instructions for determining that the container is in a list of live containers.

13. The non-transitory machine readable medium of claim 9, wherein a container is a self-contained execution environment that shares a kernel of the host machine's operating system.

14. The non-transitory machine readable medium of claim 9, wherein the receiving the notification, determining whether the file access event is for accessing the location in the file system, identifying the namespace, determining the process is a container, and the sending are performed by a file introspection agent executing in a user space of the host machine inside the guest VM.

15. A system comprising:

a set of processing unit; and a non-transitory machine readable medium storing a program for providing security for containers executing in guest virtual machines (VMs) on a physical host machine, the program executable by a processing unit, the program comprising sets of instructions for:

receiving a notification of a file access request, the notification comprising a path in a file system of the host machine being accessed by a process;

determining, based on the path, whether the file access event is for accessing a location in the file system that includes volumes to which containers have access, wherein the volumes to which the containers have access are determined using a mapping of the container file system to the file system of the host machine being accessed by the process;

in response to determining that the file access event is for accessing a location in the file system to which the containers have access, identifying a namespace of the process using an identification of the process included in the file path;

determining the process is a container when the namespace belongs to a service implementing containers on the host machine; and sending an identifier of the container, an identification of a VM executing the container, and the file path to a set of security applications to determine whether the file access request to be allowed.

16. The system of claim 15, the program further comprising a set of instructions for:

registering to a file system event monitor service to receive notification of file access requests, said registering comprising sending a list of at least one of a file, a directory, and a disk mount for which file access requests to be monitored, wherein the notification of the file access request is received from the file system event monitor.

17. The system of claim 15, wherein the set of instructions for identifying the namespace comprises a set of instructions for using the identification of the process included in the file path to search the file system for the namespace associated with the identification of the process.

18. The system of claim 15, wherein the set of instructions for sending the identifier of the container and the file path to a set of security applications comprises a set of instructions for determining that the container is in a list of live containers.

19. The system of claim 15, wherein a container is a self-contained execution environment that shares a kernel of the host machine's operating system.

20. The system of claim 15, wherein the receiving the notification, determining whether the file access event is for accessing the location in the file system, identifying the namespace, determining the process is a container, and the sending are performed by a file introspection agent executing in a user space of the host machine inside the guest VM.

* * * * *